United States Patent
Dateki

(10) Patent No.: US 8,862,062 B2
(45) Date of Patent: Oct. 14, 2014

(54) RADIO APPARATUS AND METRIC CALCULATION METHOD

(75) Inventor: Takashi Dateki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 13/588,163

(22) Filed: Aug. 17, 2012

(65) Prior Publication Data

US 2013/0052976 A1    Feb. 28, 2013

(30) Foreign Application Priority Data

Aug. 29, 2011    (JP) ................. 2011-185661

(51) Int. Cl.
*G06F 17/17* (2006.01)
*H04L 25/03* (2006.01)
*H04B 7/04* (2006.01)

(52) U.S. Cl.
CPC .... H04L 25/03178 (2013.01); H04L 25/03197 (2013.01); H04B 7/0413 (2013.01)
USPC .......... 455/63.1; 708/313; 708/276; 455/67.1

(58) Field of Classification Search
None
See application file for complete search history.

(56) References Cited

U.S. PATENT DOCUMENTS 6,463,452 B1 *  10/2002  Schulist .................. 708/606
8,351,549 B1 *  1/2013   Choi et al. .............. 375/341

FOREIGN PATENT DOCUMENTS

JP    2005-217506 A    8/2005
JP    2008-085396 A    4/2008

* cited by examiner

*Primary Examiner* — Lewis West
*Assistant Examiner* — Dong-Chang Shiue
(74) *Attorney, Agent, or Firm* — Fujitsu Patent Center

(57) ABSTRACT

A subtraction section subtracts from a received signal point a replica obtained by reflecting an influence of a propagation path state in a likely transmitted signal point. A calculation section calculates a metric for the received signal point and the replica from a value which the subtraction section calculates by subtracting the replica from the received signal point by the use of a linear interpolation formula obtained by separating a quadratic function at a power of 2.

4 Claims, 12 Drawing Sheets

20 TRANSMISSION APPARATUS

10 RADIO APPARATUS

RADIO APPARATUS AND METRIC CALCULATION METHOD

CROSS-REFERENCE TO RELATED APPLICATION

This application is based upon and claims the benefit of priority of the prior Japanese Patent Application No. 2011-185661, filed on Aug. 29, 2011, the entire contents of which are incorporated herein by reference.

FIELD

The embodiments discussed herein are related to a radio apparatus for performing radio communication by the use of a plurality of antennas and its metric calculation method.

BACKGROUND

In recent years a MIMO (Multi-Input Multi-Output) technique has been applied to radio communication systems, such as WiMAX (Worldwide Interoperability for Microwave Access) and 3GPP(3rd Generation Partnership Project)-LTE (Long Term Evolution), and has become an important technique for realizing high-speed transmission.

There are various techniques regarding MIMO demodulation. Typical techniques are MLD (Maximum Likelihood Detection), MMSE (Minimum Means Square Error), ZF (Zero Forcing), and the like. With the MLD a receiver calculates, for example, a metric for replicas of a plurality of transmitted signal points which are likely to be transmitted from a transmitter and a received signal point. The receiver then makes a search for a replica for which a calculated metric is the smallest. By doing so, the receiver estimates a transmitted signal point transmitted by the transmitter.

The MLD gives very high receiving performance compared with the MMSE or the ZF. The MLD can realize a low error rate in the same environment. On the other hand, a processing amount in the MLD is larger than a processing amount in the MMSE or the ZF. Circuit scale for the MLD is larger than circuit scale for the MMSE or the ZF. In addition, power consumption in the MLD is higher than power consumption in the MMSE or the ZF.

Many methods for reducing a processing amount in the MLD are devised. Methods based on QRM-MLD, symbol ranking, and the like are proposed. With these methods a search is not made for all replicas. On the basis of a step-by-step algorithm for narrowing down candidate replicas, the number of replicas to be searched for is reduced to reduce a processing amount.

Usually MLD receivers use squared Euclidean distance as a metric for many replicas and a received signal point. The reason for this is as follows. When a transmitted signal point is transmitted, first an MLD receiver makes a search for a transmitted signal point which maximizes the probability of a received signal point it receives. The probability of the transition from a transmitted signal point to a received signal point depends on squared Euclidean distance between a replica and the received signal point. That is to say, making a search for a replica of a transmitted signal point for which the probability is the highest is equivalent to making a search for a replica for which squared Euclidean distance is the shortest.

In the past, the following radio communication apparatus was provided. When radio communication is performed by the use of the MIMO technique, good characteristics can be realized. Furthermore, circuit scale and the number of operations are realistic (see, for example, Japanese Laid-open Patent Publication No. 2005-217506).

However, calculating squared Euclidean distance includes a square calculation and therefore needs a multiplier. In order to make a search for many replicas, a large number of multiplication processes are needed. This increases circuit scale and power consumption.

SUMMARY

According to an aspect of the invention, there is provided a radio apparatus for performing radio communication by the use of a plurality of antennas, including a subtraction section which subtracts from a received signal point a replica obtained by reflecting an influence of a propagation path state in a likely transmitted signal point and a calculation section which calculates a metric for the received signal point and the replica from a value calculated by the subtraction section by the use of a linear interpolation formula obtained by separating a quadratic function at a power of 2.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
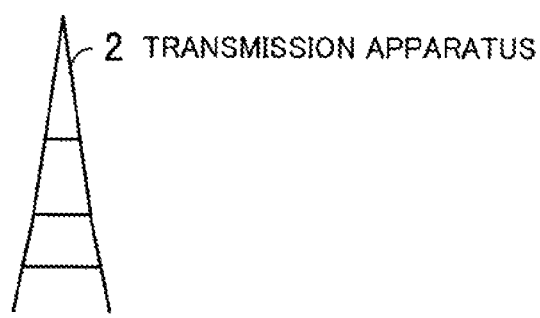
FIG. 1 is a block diagram of a radio apparatus according to a first embodiment.
Figure 1:
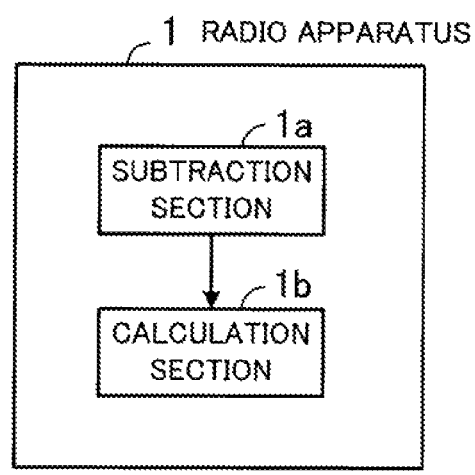

Embodiments will now be described in detail with reference to the accompanying drawings, wherein like reference numerals refer to like elements throughout.

First Embodiment

FIG. 1 is a block diagram of a radio apparatus according to a first embodiment. As illustrated in FIG. 1, a radio apparatus 1 includes a subtraction section 1a and a calculation section 1b. A transmission apparatus 2 which transmits data to the radio apparatus 1 is also illustrated in FIG. 1. Each of the radio apparatus 1 and the transmission apparatus 2 includes a plurality of antennas and performs radio communication by MIMO.

The subtraction section 1a included in the radio apparatus 1 subtracts a replica obtained by reflecting an influence of a propagation path state in a likely transmitted signal point from a received signal point received from the transmission apparatus 2.

The received signal point and the replica are represented as complex numbers by I-Q coordinates. Accordingly, subtracting the replica from the received signal point means calculating the vector of the received signal point to the replica. A value obtained from the subtraction section 1a is given by $$a+jb \qquad (1)$$

where j is an imaginary unit.

The calculation section 1b calculates a metric for the received signal point and the replica from the value which the subtraction section 1a calculates by subtracting the replica from the received signal point by the use of a linear interpolation formula obtained by separating a quadratic function at a power of 2.

A metric for the received signal point and the replica calculated by the use of squared Euclidean distance is given by $$a^2+b^2 \qquad (2).$$

As stated above, on the other hand, the calculation section 1b calculates the metric by the use of a linear interpolation formula obtained by separating a quadratic function at a power of 2. For example, a linear interpolation formula obtained by separating the quadratic function $f(x)=x^2$ at a power of 2 is given by $$f(x)=2^{n-1}(3|x|-2^n) \qquad (3)$$

where n is the number of digits of x represented by binary numbers.

Accordingly, a metric calculated by the calculation section 1b is given by $$2^{k-1}(3|a|-2^k)+2^{l-1}(3|b|-2^l) \qquad (4)$$

where k is the number of digits of a represented by binary numbers and l is the number of digits of b represented by binary numbers. The first term in expression (4) is used for calculating an approximate value of the first term in expression (2). The second term in expression (4) is used for calculating an approximate value of the second term in expression (2).

For example, it is assumed that the number of bits of a and b in expression (1) outputted from the subtraction section 1a is sixteen. It is assumed that the values of a and b are 000101 . . . 101 and 0000011 . . . 001 respectively. It is assumed that leftmost and rightmost bits of each of these values represented by binary numbers are an MSB (Most Significant Bit) and an LSB (Least Significant Bit) respectively. Hereinafter leftmost and rightmost bits of a value represented by binary numbers are an MSB and an LSB respectively.

In this case, the values of the MSB (sixteenth bit) to fourteenth bit of a are 0, so the number of digits of a is thirteen. The values of the MSB to twelfth bit of b are 0, so the number of digits of b is eleven. As a result, k=13 and l=11 in expression (4). Accordingly, a metric calculated by the calculation section 1b is given by $$2^{12}(3|a|-2^{13})+2^{10}(3|b|-2^{11}) \qquad (5)$$

where, as stated above, a is 000101 . . . 101 and b is 0000011 . . . 001.

That is to say, the calculation section 1b calculates an approximate value of squared Euclidean distance by the use of a linear interpolation formula obtained by separating the quadratic function at a power of 2.

A linear interpolation formula obtained by separating a quadratic function at a power of 2 will be described.

Figure 2:
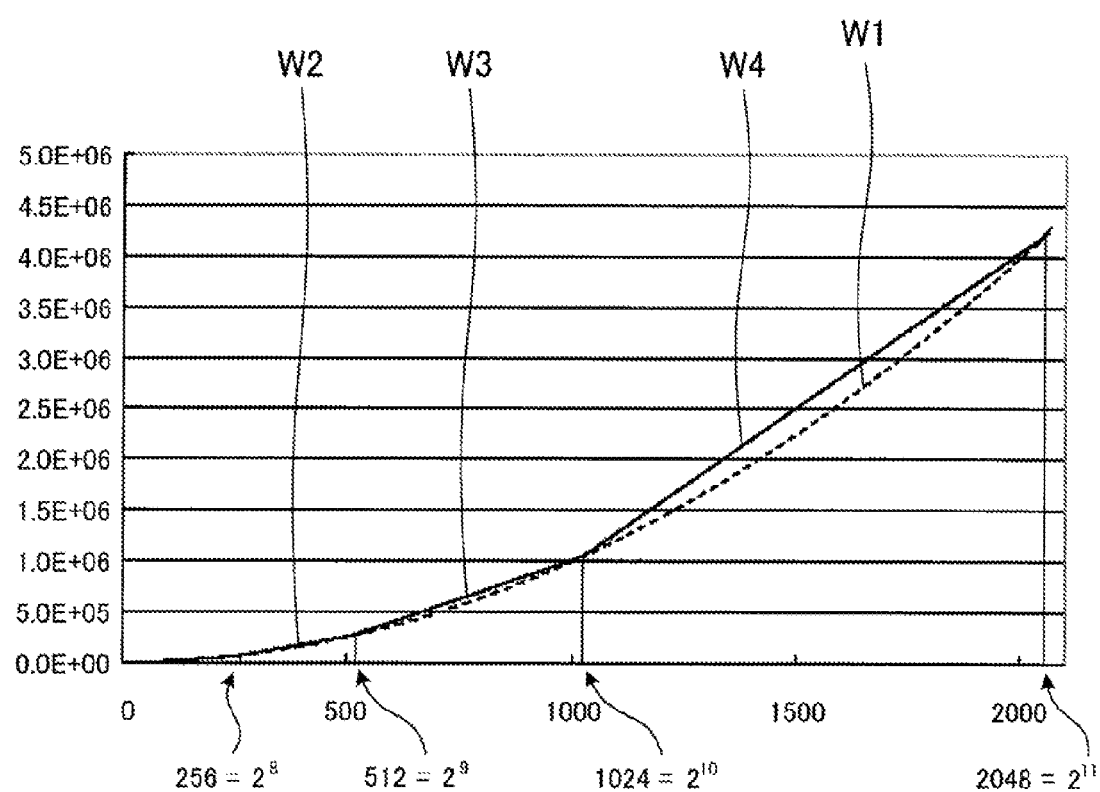
FIG. 2 is a view for describing a linear interpolation formula obtained by separating a quadratic function at a power of 2.

FIG. 2 is a view for describing a linear interpolation formula obtained by separating a quadratic function at a power of 2. A graph W1 indicated by a dotted line in FIG. 2 is a graph of $f(x)=x^2$. Graphs W2 through w4 indicated by solid lines are graphs of linear interpolation formulas obtained by separating the graph W1 at a power of 2 ($2^{n-1} \leq x < 2^n$).

For example, the graph W2 indicates a linear interpolation formula in an interval obtained by separating the graph W1 at $2^8$ and $2^9$. The graph W3 indicates a linear interpolation formula in an interval obtained by separating the graph W1 at $2^9$ and $2^{10}$. The graph W4 indicates a linear interpolation formula in an interval obtained by separating the graph W1 at $2^{10}$ and $2^{11}$. In FIG. 2, there are linear interpolation formulas (not illustrated) in intervals obtained by separating the graph W1 at 0 and $2^1$, $2^1$ and $2^2$, . . . , $2^7$ and $2^8$, $2^{11}$ and $2^{12}$, and so on.

It may safely be said that expression (3) means that a linear interpolation formula obtained by separating the quadratic function at a power of 2 ($2^{n-1} \leq x < 2^n$) is selected. For example, if n=9, then a linear interpolation formula is given by the graph W2. If n=10, then a linear interpolation formula is given by the graph W3. If n=11, then a linear interpolation formula is given by the graph W4.

For example, it is assumed that a value (approximate value) obtained by squaring 520 is calculated by expression (3) which is a linear interpolation formula. 520 is represented as "1000001000" by binary numbers. The number n of the digits is ten. Accordingly, a linear interpolation formula for calculating the square of 520 is the graph W3 (n=10) and is given by $$f(x)=2^9(3|x|-2^{10}) \qquad (6).$$

If 520 is substituted for x, the value 274432 is obtained from expression (6). The square of 520 is 270400.

A linear interpolation formula obtained by separating the quadratic function at a power of 2 is given by expression (3). The multiplication 3|x| in expression (3) can be rewritten as (2|x|+|x|). The multiplication 2|x| can be calculated by shifting |x| by one bit. In addition, $2^{n-1}$ and $(3|x|-2^n)$ can be multiplied together by shifting $(3|x|-2^n)$ by (n−1) bits.

That is to say, with the linear interpolation formula given by expression (3), a metric can be calculated by replacing a multiplier by a bit shift. In other words, the radio apparatus 1 can calculate an approximate value of squared Euclidean distance with accuracy without a multiplier. This checks an increase in circuit scale and reduces power consumption.

As has been described, the subtraction section 1a of the radio apparatus 1 subtracts a replica from a received signal point. The calculation section 1b then calculates a metric for a received signal point and a replica from a value calculated by the subtraction section 1a by the use of a linear interpolation formula obtained by separating a quadratic function at a power of 2. As a result, by adopting the radio apparatus 1, an increase in circuit scale can be checked and power consumption can be reduced.

Furthermore, the radio apparatus 1 calculates a metric by the use of a linear interpolation formula obtained by separating a quadratic function at a power of 2. As a result, the radio apparatus 1 can calculate a metric with accuracy.

Second Embodiment

A second embodiment will now be described in detail with reference to the accompanying drawings.

Figure 3:
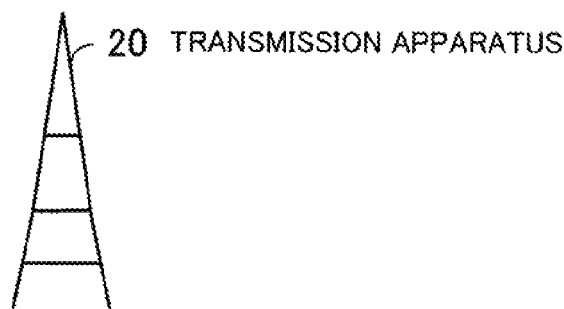
FIG. 3 illustrates a mobile communication system according to a second embodiment.
Figure 3:
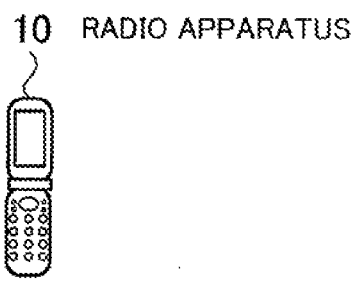

FIG. 3 illustrates a mobile communication system according to a second embodiment. As illustrated in FIG. 3, a mobile communication system includes a radio apparatus 10 and a transmission apparatus 20. Each of the radio apparatus 10 and the transmission apparatus 20 includes a plurality of antennas and performs radio communication by MIMO.

The radio apparatus 10 is, for example, a radio terminal such as a portable telephone. The transmission apparatus 20 is, for example, a base station. The radio apparatus 10 and the transmission apparatus 20 perform radio communication by, for example, LTE.

Figure 4:
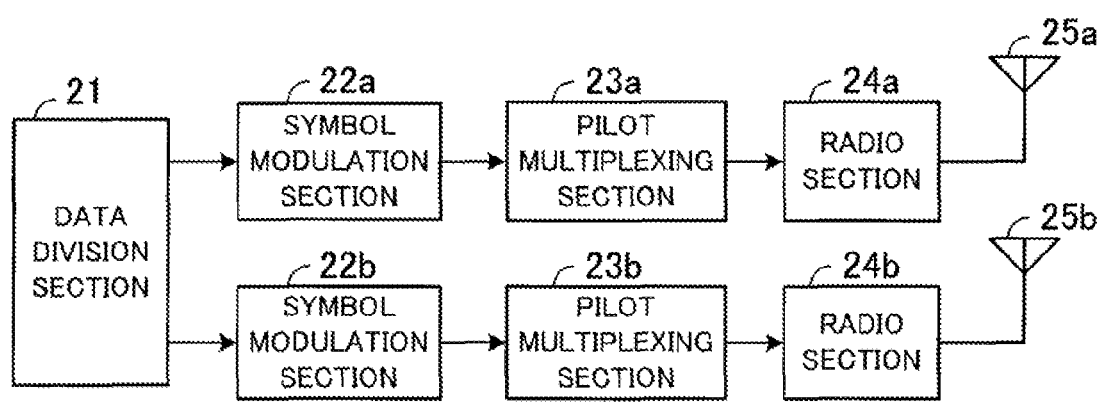
FIG. 4 is a block diagram of a transmission apparatus.

FIG. 4 is a block diagram of the transmission apparatus. As illustrated in FIG. 4, the transmission apparatus 20 includes a data division section 21, symbol modulation sections 22a and 22b, pilot multiplexing sections 23a and 23b, radio sections 24a and 24b, and antennas 25a and 25b.

Data to be radio-transmitted to the radio apparatus 10 is inputted to the data division section 21. The data division section 21 divides the data inputted and outputs it to the symbol modulation sections 22a and 22b. For example, it is assumed that data D1, D2, D3, D4, and so on are inputted to the data division section 21. The data division section 21 outputs the data D1, D3, and so on to the symbol modulation section 22a and outputs the data D2, D4, and so on to the symbol modulation section 22b.

The symbol modulation sections 22a and 22b symbol-modulate the data outputted from the data division section 21, and output it to the pilot multiplexing sections 23a and 23b. For example, the symbol modulation sections 22a and 22b symbol-modulate the data outputted from the data division section 21 by QPSK (Quadrature Phase Shift Keying) or M-QAM (Quadrature Amplitude Modulation).

The pilot multiplexing sections 23a and 23b combine symbols outputted from the symbol modulation sections 22a and 22b, respectively, with pilot signals (pilot symbols). The radio apparatus 10 can estimate a channel state of a radio wave propagation path by a pilot signal combined with a data symbol.

The radio sections 24a and 24b convert the symbols outputted from the pilot multiplexing sections 23a and 23b to radio-frequency radio signals, and output them to the antennas 25a and 25b respectively.

In the example of FIG. 4, the transmission apparatus 20 uses the two antennas 25a and 25b for transmitting radio signals. However, the transmission apparatus 20 may include three or more antennas. For example, if the transmission apparatus 20 includes n antennas, then the transmission apparatus 20 includes n symbol modulation sections, n pilot multiplexing sections, and n radio sections according to the number of the antennas. The data division section 21 divides input data into n pieces and outputs them to the n symbol modulation sections.

Figure 5:
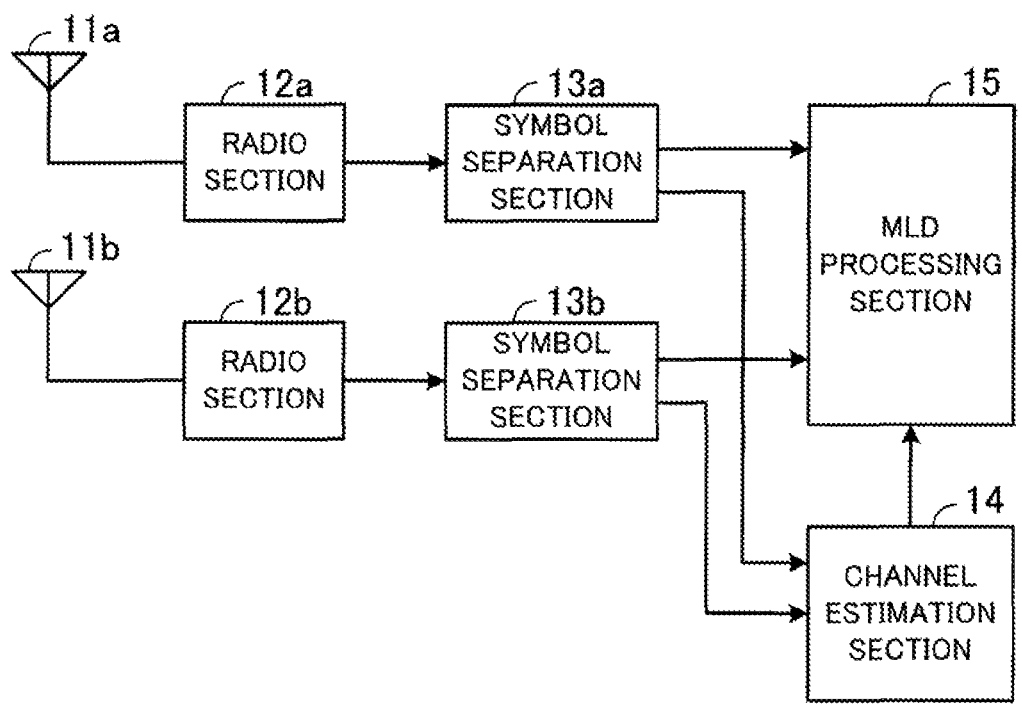
FIG. 5 is a block diagram of a radio apparatus.

FIG. 5 is a block diagram of the radio apparatus. As illustrated in FIG. 5, the radio apparatus 10 includes antennas 11a and 11b, radio sections 12a and 12b, symbol separation sections 13a and 13b, a channel estimation section 14, and an MLD processing section 15.

The radio sections 12a and 12b convert the frequencies of radio signals received by the antennas 11a and 11b to baseband frequencies, and extract baseband signals.

The symbol separation sections 13a and 13b separate the baseband signals outputted from the radio sections 12a and 12b into data symbols and pilot signal symbols. The symbol separation sections 13a and 13b output the data symbols after the separation to the MLD processing section 15 and output the pilot signal symbols after the separation to the channel estimation section 14.

A data symbol (received signal point) outputted from the symbol separation section 13a or 13b is given by $$r_i = \sum_{j=1}^{N_{tx}} H_{ij} s_j + n_i \tag{7}$$

where $H_{ij}$ is an element of a transfer function matrix H, i corresponds to the antennas 11a and 11b of the radio apparatus 10, j corresponds to the antennas 25a and 25b, $N_{tx}$ is the total number of antennas at the transmitting end, $s_j$ is a signal point transmitted from an antenna j of the transmission apparatus 20, and $n_i$ is noise, such as external noise or thermal noise, included in a signal received by an antenna i. In this example, i=1 means the antenna 11a and i=2 means the antenna 11b. j=1 means the antenna 25a and j=2 means the antenna 25b. The transmission apparatus 20 includes the two antennas 25a and 25b, so $N_{tx}$=2.

The channel estimation section 14 calculates a channel value of a propagation path for each of the antennas 11a and 11b with respect to each of the antennas 25a and 25b of the transmission apparatus 20 by the use of pilot signals outputted from the symbol separation sections 13a and 13b. That is to say, the channel estimation section 14 calculates each element of the transfer function matrix H.

For example, the channel estimation section 14 calculates a channel value of a propagation path between the antennas 25a and 11a and a channel value of a propagation path between the antennas 25b and 11a. In addition, the channel estimation section 14 calculates a channel value of a propagation path between the antennas 25a and 11b and a channel value of a propagation path between the antennas 25b and 11b.

Channel values calculated by the channel estimation section 14 and the data symbols outputted from the symbol separation sections 13a and 13b are inputted to the MLD processing section 15. The MLD processing section 15 demodulates by MLD data transmitted by the transmission apparatus 20 from the channel values calculated by the channel estimation section 14 and the data symbols outputted from the symbol separation sections 13a and 13b.

In the example of FIG. 5, the radio apparatus 10 receives radio signals by the two antennas 11a and 11b. However, the radio apparatus 10 may include three or more antennas. For example, if the radio apparatus 10 includes n antennas, then the radio apparatus 10 includes n radio sections and n symbol separation sections according to the number of the antennas.

For the sake of simplicity description will now be given with 2×2 MIMO in which the transmission apparatus 20 includes the two antennas 25a and 25b and in which the radio apparatus 10 includes the two antennas 11a and 11b as an example. However, it is a matter of course that the following description applies to n×m MIMO.

Figure 6:
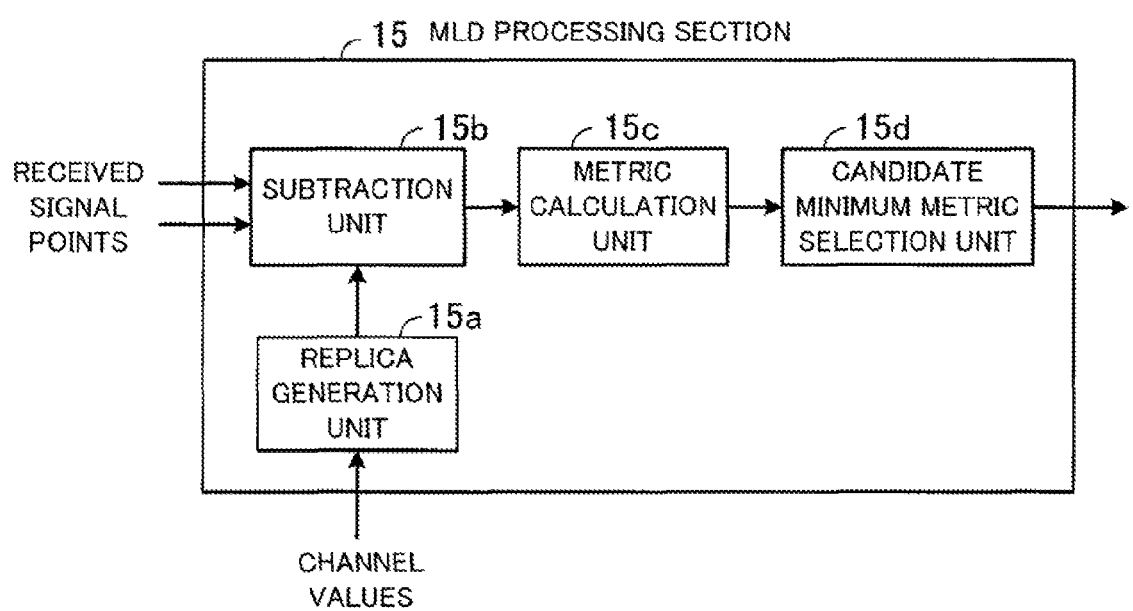
FIG. 6 is a block diagram of an MLD processing section.

FIG. 6 is a block diagram of the MLD processing section. As illustrated in FIG. 6, the MLD processing section 15 includes a replica generation unit 15a, a subtraction unit 15b, a metric calculation unit 15c, and a candidate minimum metric selection unit 15d.

A channel value calculated by the channel estimation section 14 is inputted to the replica generation unit 15a. The replica generation unit 15a generates a replica in which the channel value calculated by the channel estimation section 14 is taken into consideration. For example, the replica generation unit 15a generates a replica by multiplying a plurality of transmitted signal points which are likely to be transmitted from the transmission apparatus 20 and the transfer function matrix H together. That is to say, the replica generation unit 15a generates a replica by changing the amplitude of a plurality of transmitted signal points which are likely to be transmitted from the transmission apparatus 20 or rotating a plurality of transmitted signal points which are likely to be transmitted from the transmission apparatus 20, according to the state of a propagation path.

To be concrete, it is assumed that signal points which are likely to be transmitted from the antennas 25a and 25b of the transmission apparatus 20 are $s_j(k)$ where, as stated above, j corresponds to the antenna 25a or 25b of the transmission apparatus 20.

The value of k depends on a modulation scheme applied to an antenna j. For example, if QPSK is applied $$\pm 1/\sqrt{2} \tag{a}$$

to an antenna j, then k=1, 2, . . . , and 4 and, on each of an I axis and a Q axis, the value of signal points $s_j(k)$ which are likely to be transmitted from an antenna j are Furthermore, if 16QAM is applied to an antenna j, then k=1, 2, . . . , and 16 and, on each of the I axis and the Q axis, the values of signal points $s_j(k)$ which are likely to be transmitted from an antenna j are $$\pm 1/\sqrt{10}, \pm 3/\sqrt{10} \tag{b}$$

In addition, if 64QAM is applied to an antenna j, then k=1, 2, . . . , and 64 and, on each of the I axis and the Q axis, the values of signal points $s_j(k)$ which are likely to be transmitted from an antenna j are $$\pm 1/\sqrt{42}, \pm 3/\sqrt{42}, \pm 5/\sqrt{42}, \pm 7/\sqrt{42} \tag{c}$$

The replica generation unit 15a generates a replica by multiplying $s_j(k)$ and the transfer function matrix H together. For example, if 64QAM is applied to an antenna j as a modulation scheme, then k=1, 2, . . . , and 64 and the replica generation unit 15a calculates $H_{ij}s_j(k)$ for signal points $s_j(k)$ where $H_{ij}$ is an element of the transfer function matrix H, i corresponds to the antenna 11a or 11b of the radio apparatus 10 as stated above, and corresponds to the antenna 25a or 25b of the transmission apparatus 20 as stated above.

It is assumed that signal points $s_j(k)$ indicated by the above (a) through (c) corresponding to the different modulation schemes are multiplied by $2^{1/2}$, $10^{1/2}$, and $42^{1/2}$ respectively. Then, on each of the I axis and the Q axis, values (values of real parts and imaginary parts) corresponding to the different modulation schemes are:

QPSK: $\pm 1$ (d)

16QAM: $\pm 1, \pm 3$ (e)

64QAM: $\pm 1, \pm 3, \pm 5, \pm 7$ (f)

Therefore, the replica generation process includes the multiplication $H_{ij}s_j(k)$, but the number of multiplications can be reduced by resolving them into their components.

With 64QAM, for example, a real part of $H_{ij}s_j(k)$ can be calculated by $$Re(H_{ij}s_j(k))=Re(H_{ij})Re(s_j(k))-Im(H_{ij})Im(s_j(k)) \tag{8}$$

The first term on the right side of expression (8) can be changed into $$Re(H_{ij})Re(s_j(k))=Re(H_{ij})/\sqrt{42}\cdot Re(\sqrt{42}s_j(k))=ARe(\sqrt{42}s_j(k))\ (A=Re(H_{ij})/\sqrt{42}) \tag{9}$$

The values of $42^{1/2}s_j(k)$ on the rightmost side of equation (9) are given by the above (f). Accordingly, the replica generation unit 15a can calculate the first term on the right side of expression (8) by calculating $\pm A$, $\pm 3A$, $\pm 5A$, and $\pm 7A$.

3A can be changed into 3A=2A+A. 5A can be changed into 5A=4A+A. 7A can be changed into 7A=8A−A. The multiplications 2A, 4A, and 8A can be realized by bit shifts. In addition, −A, −3A, −5A, and −7A can be calculated by changing the signs of A, 3A, 5A, and 7A respectively. Accordingly, for example, the replica generation unit 15a stores the constants indicated by the above (f) in a storage device, such as a memory, and calculates A once. After that, the replica generation unit 15a performs a bit shift, an addition process, and a sign change. By doing so, the replica generation unit 15a can calculate the first term on the right side of expression (8). That is to say, the replica generation unit 15a can calculate the first term on the right side of expression (8) by carrying out a multiplication once.

The replica generation unit 15a can also calculate the second term on the right side of expression (8) in the same way that is described above.

Furthermore, with 64QAM the replica generation unit 15a can calculate an imaginary part of $H_{ij}s_j(k)$ by $$Im(H_{ij}s_j(k))=Re(H_{ij})Im(s_j(k))+Im(H_{ij})Re(s_j(k)) \tag{10}$$

The replica generation unit 15a can calculate the values of expression (10) in the same way that is used for calculating the real part of $H_{ij}s_j(k)$.

In the above description a replica is generated in the case of 64QAM being applied. However, a replica can be generated in the same way even in the case of another modulation scheme being applied.

Furthermore, in the above description it is assumed that if a signal point $s_j(k)$ which are likely to be transmitted from the transmission apparatus 20 occurs with an equal probability, its amplitude is set so as to make the power of $s_j(k)$ 1. If the power of $s_j(k)$ is not 1, the replica generation unit 15a performs standardization on the basis of amplitude corresponding to the power. By doing so, the replica generation unit 15a can generate a replica in the same way that is described above.

The subtraction unit 15b subtracts replicas generated by the replica generation unit 15a from received signal points outputted from the symbol separation sections 13a and 13b. The subtraction of the replicas from the received signal points is expressed as $$r_i = \sum_j H_{ij}s_j(k_j) \tag{11}$$

Expression (11) is a complex number and is expressed as $$x(i)+jy(i) \tag{12}$$

x(i) and y(i) are calculated for various combinations of $s_1(k_1)$ and $s_2(k_2)$. For example, it is assumed that both of $s_1(k_1)$ and $s_2(k_2)$ are modulated by 64QAM. Then $k_1$ of $s_1(k_1)$ is $k_1=1, 2, \ldots$, and 64 and $k_2$ of $s_2(k_2)$ is $k_2=1, 2, \ldots$, and 64. Therefore, there are (64×64) combinations of $s_1(k)$ and $s_2(k)$. In this case, combinations of replicas to be searched for can be narrowed down by a method based on QRM-MLD, symbol ranking, or the like in order to reduce the number of calculations.

That is to say, the subtraction unit 15b calculates x(i) and y(i) at an antenna i of the radio apparatus 10 and outputs results to the metric calculation unit 15c.

The metric calculation unit 15c calculates a metric for a symbol (received signal point) and a replica from the values x(i) and y(i) calculated by the subtraction unit 15b by the use of a linear interpolation formula obtained by separating a quadratic function at a power of 2.

If squared Euclidean distance is used, a metric for a received signal point and a replica is given by $$\text{metric} = \sum_{i=1}^{N}(|x(i)|^2 + |y(i)|^2) \quad (13)$$

As indicated in expression (13), calculation of squared Euclidean distance includes multiplication. That is to say, in order to calculate squared Euclidean distance, a multiplier for multiplying, for example, x(i) and y(i) together is needed.

As stated above, on the other hand, the metric calculation unit 15c calculates a metric for a received signal point and a replica from the values x(i) and y(i) calculated by the subtraction unit 15b by the use of a linear interpolation formula obtained by separating a quadratic function at a power of 2. Accordingly, as is described later in detail, the metric calculation unit 15c can calculate a metric for a received signal point and a replica without a multiplier.

The candidate minimum metric selection unit 15d selects a combination of transmitted signal points $s_1(k_1)$ and $s_2(k_2)$ for which a metric calculated by the metric calculation unit 15c is the smallest.

Figure 7:
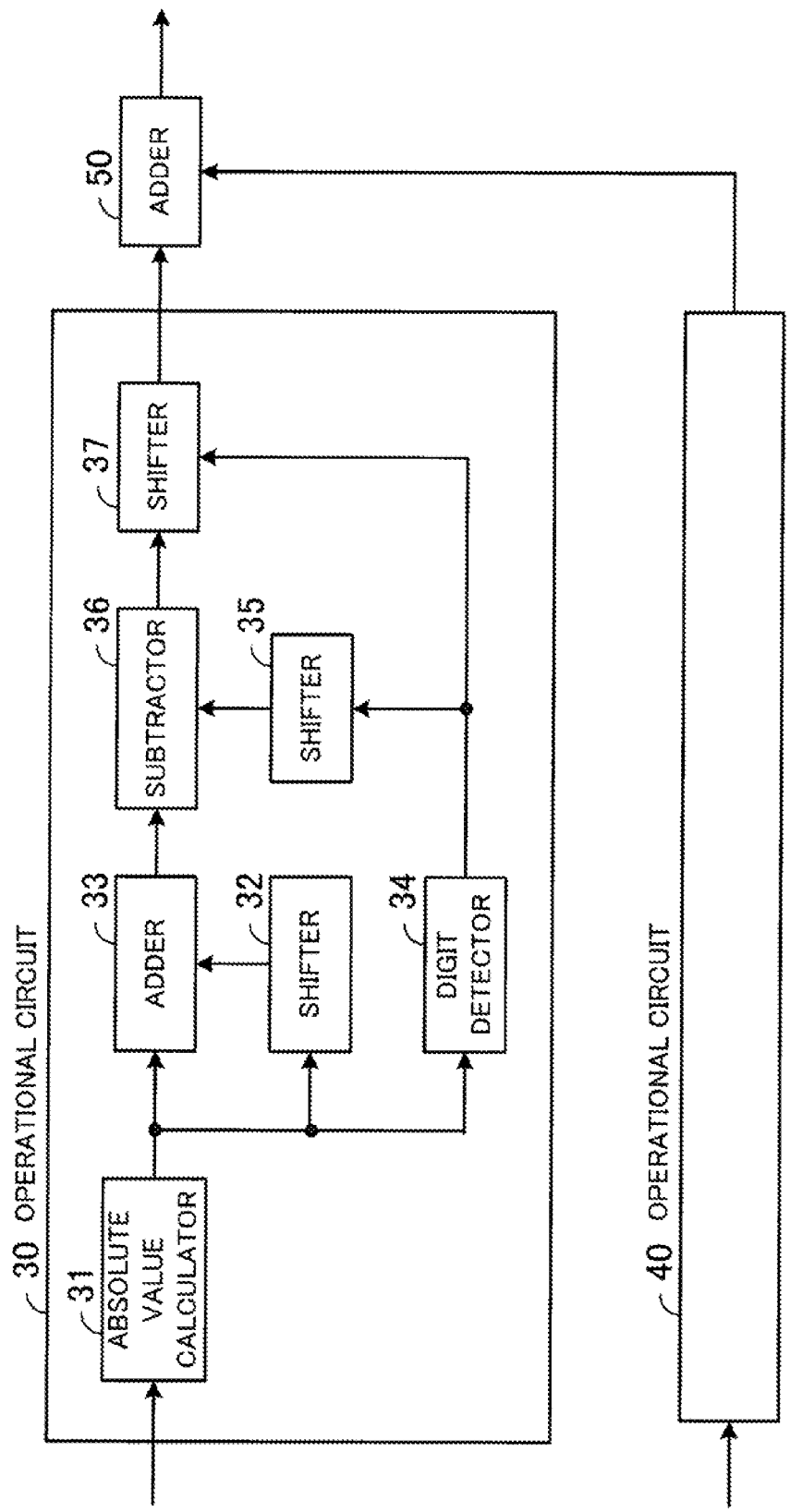
FIG. 7 is a block diagram of a metric calculation unit.

FIG. 7 is a block diagram of the metric calculation unit. As illustrated in FIG. 7, the metric calculation unit 15c includes operational circuits 30 and 40 and an adder 50. x(i) outputted from the subtraction unit 15b is inputted to the operational circuit 30 and y(i) outputted from the subtraction unit 15b is inputted to the operational circuit 40. Hereinafter x(i) and y(i) may simply be referred to as x and y respectively.

The operational circuit 30 calculates an approximate value of $x^2$ by the use of a linear interpolation formula obtained by separating a quadratic function at a power of 2. The operational circuit 40 calculates an approximate value of $y^2$ by the use of a linear interpolation formula obtained by separating a quadratic function at a power of 2. For example, expression (3) is used as a linear interpolation formula obtained by separating a quadratic function at a power of 2.

The adder 50 adds the approximate value of $x^2$ outputted from the operational circuit 30 and the approximate value of $y^2$ outputted from the operational circuit 40. That is to say, the adder 50 outputs an approximate value of squared Euclidean distance indicated by expression (13).

The operational circuit 30 includes an absolute value calculator 31, shifters 32, 35, and 37, an adder 33, a digit detector 34, and a subtractor 36. The operational circuit 30 uses these components for performing an operation indicated by expression (3).

x outputted from the subtraction unit 15b is inputted to the absolute value calculator 31. The absolute value calculator 31 calculates the absolute value |x| of x inputted.

The shifter 32 shifts |x| outputted from the absolute value calculator 31 by one bit in order to calculate twice |x|.

|x| outputted from the absolute value calculator 31 and 2|x| outputted from the shifter 32 are inputted to the adder 33. The adder 33 adds |x| and 2|x| inputted thereto. That is to say, the adder 33 calculates 3|x| in expression (3).

The digit detector 34 detects the number of digits of |x| outputted from the absolute value calculator 31. For example, the digit detector 34 outputs the number of digits of |x| as a flag the bit width of which is the same as that of |x|. For example, the digit detector 34 outputs a flag the bit width of which is the same as that of |x| and in which a bit corresponding to the number of digits of |x| is 1.

To be concrete, it is assumed that |x| outputted from the absolute value calculator 31 is 16-bit data. The digit detector 34 outputs a 16-bit flag indicative of the number of digits of the 16-bit data |x|. It is assumed that a first bit from the right of the 16-bit flag outputted from the digit detector 34 corresponds to a first digit of the 16-bit data |x|. It is assumed that a second bit from the right of the 16-bit flag outputted from the digit detector 34 corresponds to a second digit of the 16-bit data |x|. Similarly, it is assumed that a sixteenth bit from the right of the 16-bit flag outputted from the digit detector 34 corresponds to a sixteenth digit of the 16-bit data |x|.

It is assumed that |x| inputted to the digit detector 34 is 000101 ... 101 (16 bits). In this case, a 16-bit flag in which a thirteenth bit from the right is 1 and in which the other bits are 0 is outputted from the digit detector 34.

The shifter 35 shifts by one bit the flag indicative of the number of digits of |x| which is outputted from the digit detector 34 in order to calculate twice the flag. The flag in which each bit corresponds to the number of digits of |x| is outputted from the digit detector 34. Therefore, if the number of digits of |x| is, for example, n, then the value $2^n$ corresponding to twice the value of the flag is outputted from the shifter 35.

For example, it is assumed that, as in the above example, the flag in which the thirteenth bit from the right is 1 is outputted from the digit detector 34. This value is expressed as $2^{12}$ by a power of 2. If a bit shift is performed to calculate twice the flag, then $2^{13}$ is obtained.

That is to say, if the number of digits of |x| is n, then the value $2^{n-1}$ is outputted from the digit detector 34. The shifter 35 calculates twice this value and outputs the value $2^n$. That is to say, the shifter 35 calculates $2^n$ in the parentheses on the right side of expression (3).

The subtractor 36 subtracts $2^n$ outputted from the shifter 35 from 3|x| outputted from the adder 33. That is to say, the subtractor 36 calculates "$3|x|-2^n$" in expression (3).

The number of digits of |x| outputted from the digit detector 34 and "$3|x|-2^n$" outputted from the subtractor 36 are inputted to the shifter 37. The shifter performs a bit shift in order to calculate $2^{(number\ of\ digits)-1}$ times "$3|x|-2^n$" outputted from the subtractor 36. That is to say, if the number of digits of |x| is n, then the shifter 37 calculates $2^{n-1}$ times "$3|x|-2^n$". That is to say, the shifter 37 calculates the right side of expression (3).

As a result, the operational circuit 30 outputs a value indicated by $$2^{n-1}(3|x|-2^n) \quad (14)$$

where n is the number of digits of |x|.

The operational circuit 40 includes the same components that are used in the operational circuit 30. Accordingly, the operational circuit 40 outputs a value indicated by $$2^{m-1}(3|y|-2^m) \quad (15)$$

where m is the number of digits of |y|.

The adder 50 adds the value outputted from the operational circuit 30 and the value outputted from the operational circuit 40. A value outputted from the adder 50 is given by $$2^{n-1}(3|x|-2^n)+2^{m-1}(3|x|-2^m) \quad (16).$$

The first term in expression (16) corresponds to $|x|^2$ in expression (13) and the second term in expression (16) corresponds to $|y|^2$ in expression (13). A metric for a received signal point and a replica is outputted in this way from the metric calculation unit 15c.

Figure 8:
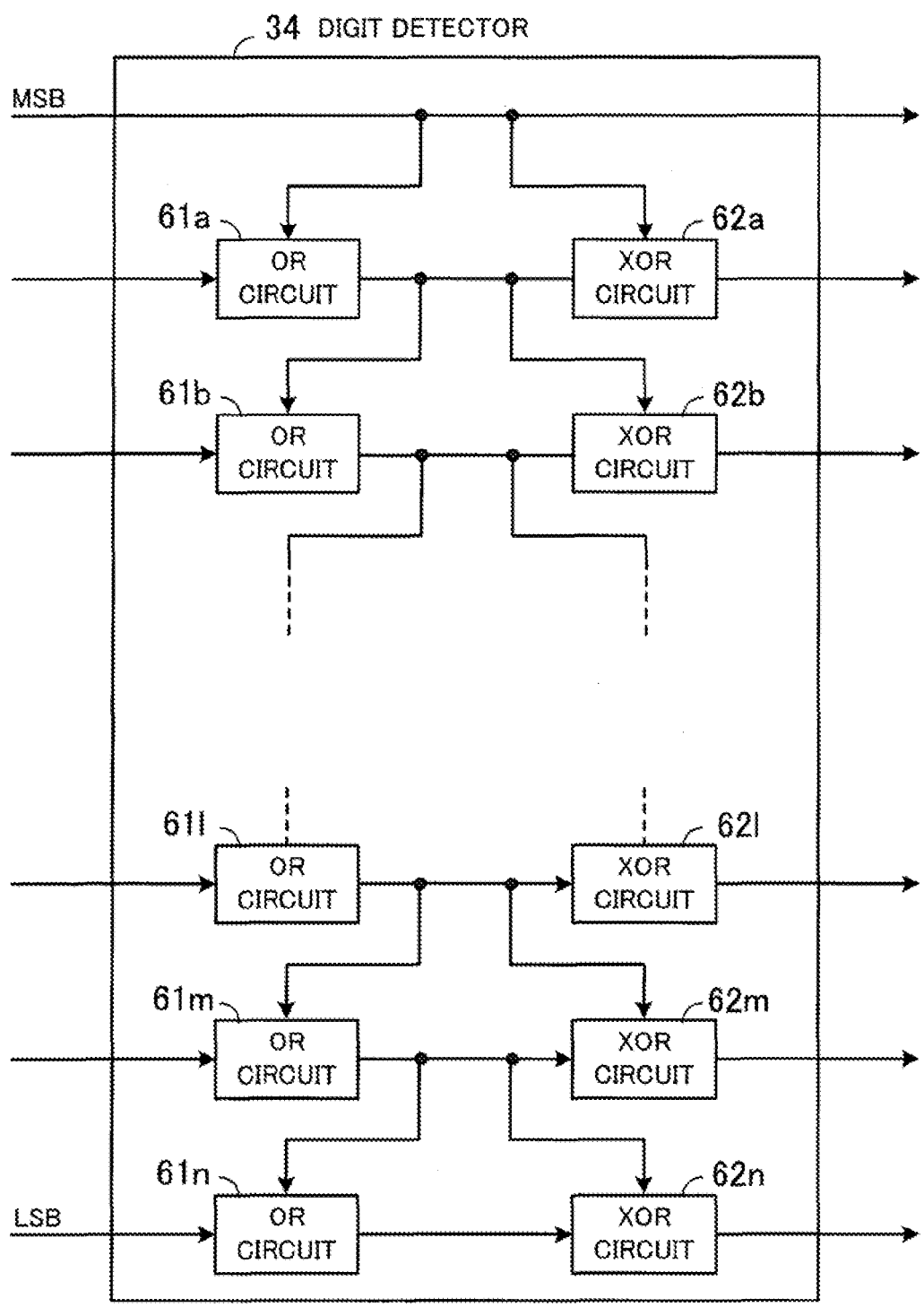
FIG. 8 is a block diagram of a digit detector.

FIG. 8 is a block diagram of the digit detector. As illustrated in FIG. 8, the digit detector 34 includes OR circuits 61a, 61b, ..., 61l, 61m, and 61n and XOR circuits 62a, 62b, ..., 62l, 62m, and 62n.

An MSB of |x| and a bit one order lower than the MSB are inputted to the OR circuit 61a. The OR circuit 61a performs an OR operation on the MSB of |x| and the bit one order lower than the MSB.

The MSB of |x| and a result of the OR operation performed by the OR circuit 61a are inputted to the XOR circuit 62a. The XOR circuit 62a performs an XOR operation on the MSB of |x| and the result of the OR operation performed by the OR circuit 61a.

The result of the OR operation performed by the OR circuit 61a and a bit two orders lower than the MSB of |x| are inputted to the OR circuit 61b. The OR circuit 61b performs an OR operation on the result of the OR operation performed by the OR circuit 61a and the bit two orders lower than the MSB of |x|.

The result of the OR operation performed by the OR circuit 61a and a result of the OR operation performed by the OR circuit 61b are inputted to the XOR circuit 62b. The XOR circuit 62b performs an XOR operation on the result of the OR operation performed by the OR circuit 61a and the result of the OR operation performed by the OR circuit 61b.

Similarly, the remaining OR circuits and XOR circuits perform OR operations and XOR operations respectively. An LSB of |x| is inputted to the OR circuit 61n.

When a bit some orders lower than the MSB of |x| first becomes 1, an OR circuit corresponding to the bit outputs 1. An XOR circuit corresponding to the bit also outputs 1.

1 is inputted to an OR circuit corresponding to a bit lower in order than the bit which is 1 from an OR circuit corresponding to a bit one order higher than the bit lower in order than the bit which is 1. Accordingly, whether a bit of |x| inputted is 0 or 1, this OR circuit outputs 1.

1 is inputted to an XOR circuit corresponding to a bit lower in order than the bit which is 1 from a corresponding OR circuit. In addition, 1 is inputted to this XOR circuit from an OR circuit corresponding to a bit one order higher than the bit lower in order than the bit which is 1. Accordingly, this XOR outputs 0.

That is to say, when a bit some orders lower than the MSB of |x| first becomes 1, the digit detector 34 outputs 1. The digit detector 34 outputs 0 for a bit lower in order than the bit which first becomes 1. If the MSB of |x| is 1, then the digit detector 34 outputs 1. The digit detector 34 outputs 0 for a bit lower in order than the MSB.

The metric calculation unit 15c illustrated in FIG. 7 includes the absolute value calculator 31, the shifters 32, 35, and 37, the adder 33, a digit detector 34, and the subtractor 36 and does not include a multiplier. Furthermore, as illustrated in FIG. 8, it is possible to form the digit detector 34 without a multiplier. That is to say, the metric calculation unit 15c can calculate a metric for a received signal point and a replica without a multiplier. Accordingly, by adopting the metric calculation unit 15c, an increase in circuit scale can be checked and power consumption can be reduced.

Figure 9:
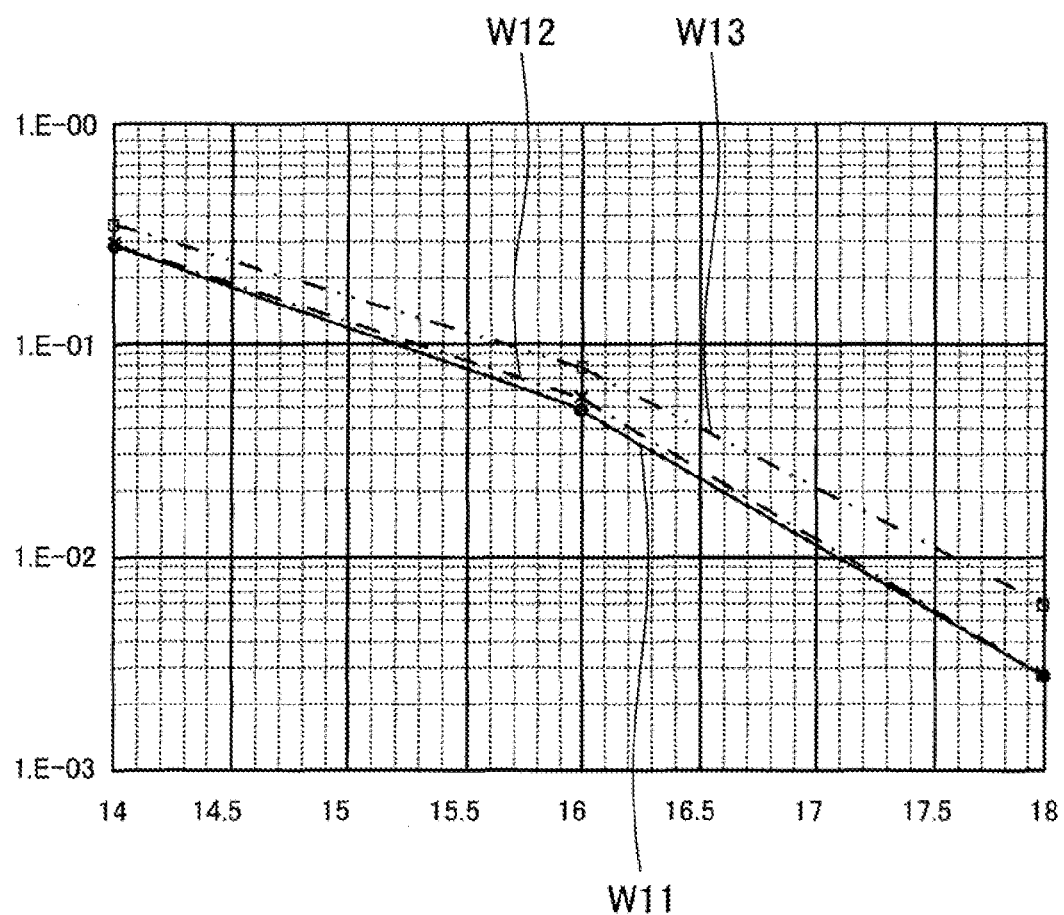
FIG. 9 indicates results obtained by simulating an error rate in the cases of calculating a metric by the use of a linear interpolation formula, squared Euclidean distance, and Manhattan distance.

FIG. 9 indicates results obtained by simulating an error rate in the cases of calculating a metric by the use of a linear interpolation formula, squared Euclidean distance, and Manhattan distance. In FIG. 9, a horizontal axis indicates SNR (Signal Noise Ratio) and a vertical axis indicates the rate of an error in data received by the radio apparatus 10.

A waveform W11 drawn by a solid line in FIG. 9 indicates results obtained by simulating a data error rate in the case of calculating a metric by the use of squared Euclidean distance. A waveform W12 drawn by a dot-dash line in FIG. 9 indicates results obtained by simulating a data error rate in the case of calculating a metric by the use of a linear interpolation formula obtained by separating a quadratic function at a power of 2. A waveform W13 drawn by a chain double-dashed line in FIG. 9 indicates results obtained by simulating a data error rate in the case of calculating a metric by the use of Manhattan distance.

As indicated by the waveform W13, the error rate obtained in the case of calculating a metric by the use of Manhattan distance is higher than the error rate obtained in the case of calculating a metric by the use of squared Euclidean distance. As indicated by the waveform W12, on the other hand, the error rate obtained in the case of calculating a metric by the use of a linear interpolation formula obtained by separating a quadratic function at a power of 2 is lower than the error rate obtained in the case of calculating a metric by the use of Manhattan distance, and is almost the same as the error rate obtained in the case of calculating a metric by the use of squared Euclidean distance.

Figure 10:
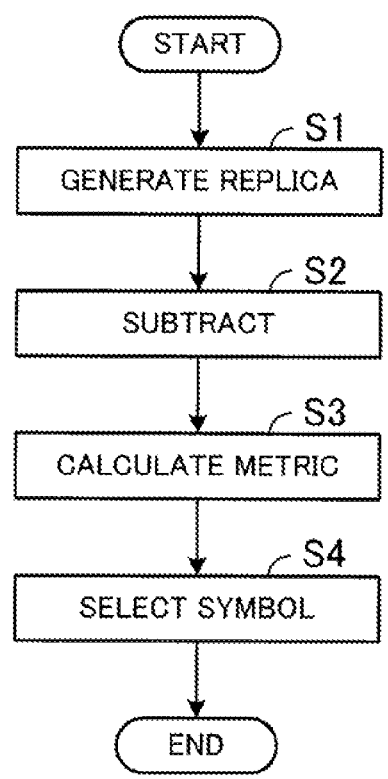
FIG. 10 is a flow chart of the operation of the radio apparatus.

FIG. 10 is a flow chart of the operation of the radio apparatus.

(Step S1) The replica generation unit 15a generates a replica on the basis of channel values calculated by the channel estimation section 14 and a plurality of transmitted signal points which are likely to be transmitted from the transmission apparatus 20.

(Step S2) The subtraction unit 15b subtracts the replica generated by the replica generation unit 15a from received signal points.

(Step S3) The metric calculation unit 15c calculates a metric for a received signal point and the replica from a value calculated by the subtraction unit 15b by the use of a linear interpolation formula obtained by separating a quadratic function at a power of 2.

(Step S4) The candidate minimum metric selection unit 15d selects a combination of transmitted signal points for which a metric calculated by the metric calculation unit 15c is the smallest.

As has been described, the subtraction unit 15b of the radio apparatus 10 subtracts a replica from received signal points. The metric calculation unit 15c then calculates a metric for a received signal point and the replica from a value calculated by the subtraction unit 15b by the use of a linear interpolation formula obtained by separating a quadratic function at a power of 2. This makes it possible to check an increase in circuit scale in the radio apparatus 10 and reduce the power consumption of the radio apparatus 10.

In addition, the metric calculation unit 15c calculates a metric by the use of a linear interpolation formula obtained by separating a quadratic function at a power of 2, so an error rate which is almost the same as an error rate obtained in the case of calculating a metric by the use of squared Euclidean distance can be realized.

Third Embodiment

A third embodiment will now be described in detail with reference to the accompanying drawing. In the third embodiment another example of a metric calculation unit will be described. A block diagram of a radio apparatus according to the third embodiment is the same as that of FIG. 5. Furthermore, a block diagram of an MLD processing section 15 is the same as that of FIG. 6.

A linear interpolation formula obtained by separating the quadratic function given by expression (3) at a power of 2 can be changed in the following way.

$$f(x) = 2^{n-1}(3|x| - 2^n) \quad (17)$$
$$= 2^{n-1}(|x| + 2|x| - 2^n)$$
$$= 2^{n-1}\{|x| + 2(|x| - 2^{n-1})\}.$$

$2^{n-1} \leq x < 2^n$, so "$|x|-2^{n-1}$" in expression (17) corresponds to (n−1) lowest-order bits of $|x|$ represented by binary numbers.

For example, it is assumed that $|x|$ is the 16-bit data 00 . . . 0010010100 and that an MSB to an eighth bit therefrom of this data are 0. The number of digits of $|x|$ is eight (n=8). In this case, the value "$|x|-2^{n-1}$" corresponds to the 7 lowest-order bits 10100 (seventh and sixth bits from the right are 0).

A metric calculation unit 15c in the third embodiment calculates expression (17).

Figure 11:
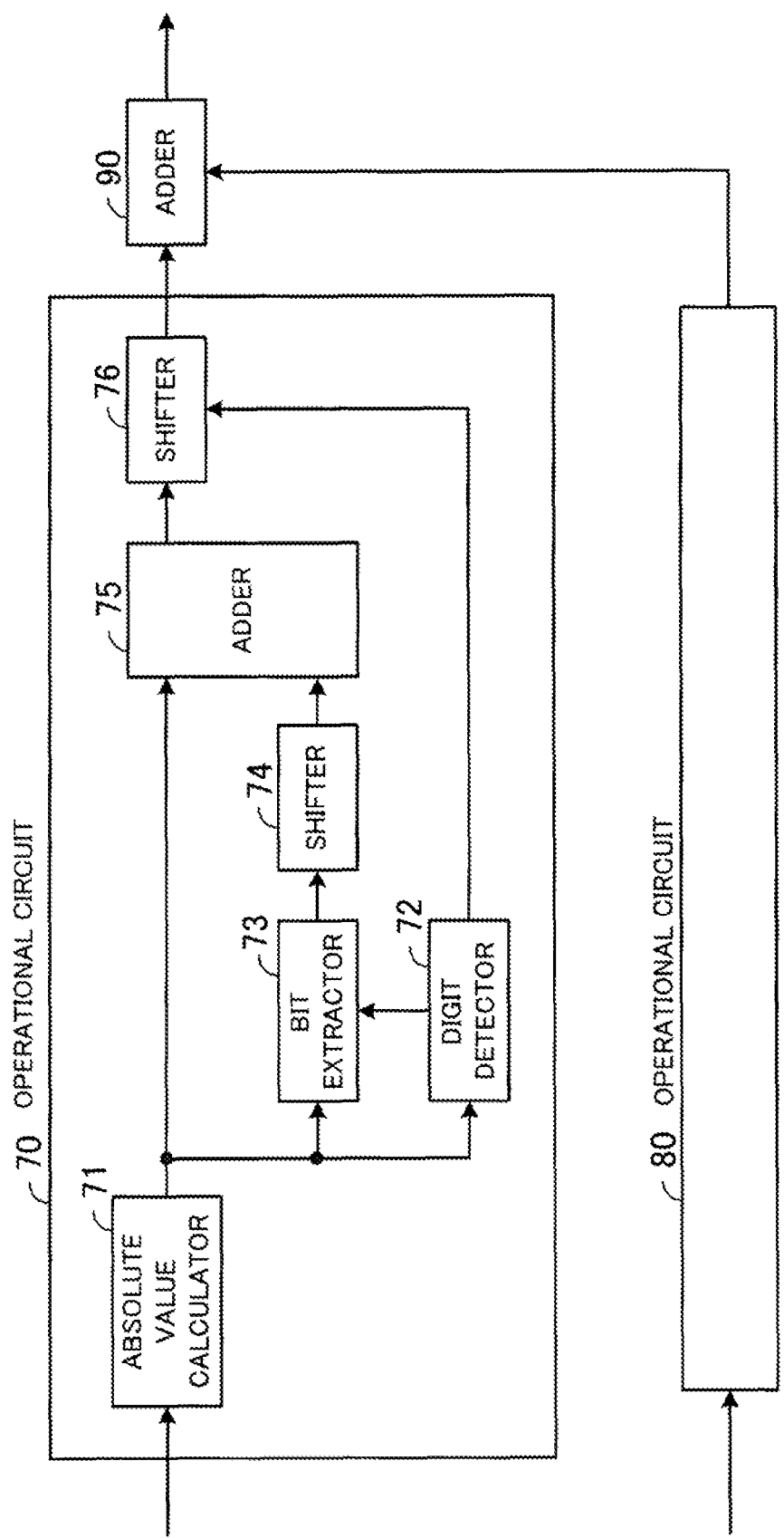
FIG. 11 is a block diagram of a metric calculation unit in a third embodiment.

FIG. 11 is a block diagram of the metric calculation unit in the third embodiment. As illustrated in FIG. 11, the metric calculation unit 15c includes operational circuits 70 and 80 and an adder 90.

x outputted from a subtraction unit 15b is inputted to the operational circuit 70 and y outputted from the subtraction unit 15b is inputted to the operational circuit 80.

The operational circuit 70 calculates an approximate value of $x^2$ by the use of a linear interpolation formula obtained by separating a quadratic function at a power of 2. The operational circuit 80 calculates an approximate value of $y^2$ by the use of a linear interpolation formula obtained by separating a quadratic function at a power of 2. Expression (17) is used as a linear interpolation formula obtained by separating a quadratic function at a power of 2.

The adder 90 adds the approximate value of $x^2$ outputted from the operational circuit 70 and the approximate value of $y^2$ outputted from the operational circuit 80. That is to say, the adder 90 outputs an approximate value of squared Euclidean distance indicated by expression (13).

The operational circuit 70 includes an absolute value calculator 71, a digit detector 72, a bit extractor 73, shifters 74 and 76, and an adder 75.

x outputted from the subtraction unit 15b is inputted to the absolute value calculator 71. The absolute value calculator 71 calculates the absolute value $|x|$ of x inputted.

The digit detector 72 detects the number of digits of $|x|$ outputted from the absolute value calculator 71. For example, the digit detector 72 outputs the number of digits of $|x|$ as a flag the bit width of which is the same as that of $|x|$. For example, the digit detector 72 outputs a flag the bit width of which is the same as that of $|x|$ and in which a bit corresponding to the number of digits of $|x|$ is 1. A block diagram of the digit detector 72 is the same as that of FIG. 8.

The bit extractor 73 extracts (n−1) lowest-order bits of $|x|$, where n is the number of digits of $|x|$. For example, if the number of digits of $|x|$ is n, then the value $2^{n-1}$ is outputted from the digit detector 72. The bit extractor 73 can extract the (n−1) lowest-order bits of $|x|$ by, for example, performing an XOR operation on $|x|$ and $2^{n-1}$. The value of the (n−1) lowest-order bits of $|x|$ extracted is $|x|-2^{n-1}$. That is to say, the bit extractor 73 calculates "$|x|-2^{n-1}$" in expression (17).

The shifter 74 performs a 1-bit shift to calculate twice the value "$|x|-2^{n-1}$" outputted from the bit extractor 73. That is to say, the shifter 74 calculates $2(|x|-2^{n-1})$ in expression (17).

The adder 75 adds $|x|$ outputted from the absolute value calculator 71 and $2(|x|-2^{n-1})$ outputted from the shifter 74. That is to say, the adder 75 calculates $|x|+2(|x|-2^{n-1})$ in expression (17).

The shifter 76 performs an (n−1)-bit shift to calculate $2^{n-1}$ times the value "$|x|+2(|x|-2^{n-1})$" outputted from the adder 75. That is to say, the shifter 76 calculates "$2^{n-1}\{|x|+2(|x|-2^{n-1})\}$" in expression (17).

The operational circuit 80 includes the same components that are used in the operational circuit 70. Accordingly, the operational circuit 80 outputs a value indicated by $$2^{m-1}\{|x|+2(|y|-2^{m-1})\} \quad (18)$$

where m is the number of digits of $|y|$.

The adder 90 adds the value outputted from the operational circuit 70 and the value outputted from the operational circuit 80. A value outputted from the adder 90 is given by $$2^{n-1}\{|x|+2(|x|-2^{n-1})\}+2^{m-1}\{|y|+2(|y|-2^{m-1})\} \quad (19).$$

The first term in expression (19) corresponds to $|x|^2$ in expression (13) and the second term in expression (19) corresponds to $|y|^2$ in expression (13). A metric for a received signal point and a replica is outputted in this way from the metric calculation unit 15c.

The metric calculation unit 15c illustrated in FIG. 11 differs from the metric calculation unit 15c illustrated in FIG. 7 in that it does not include a subtractor 36. Accordingly, compared with the metric calculation unit 15c illustrated in FIG. 7, it is possible to check an increase in circuit scale and reduce power consumption.

As has been described, the bit extractor 73 included in a radio apparatus 10 extracts bits the number of which is equal to a value obtained by subtracting one from the number of digits detected by the digit detector from a value calculated by the subtraction unit 15b. The metric calculation unit 15c then calculates a metric for a received signal point and a replica from the value calculated by the subtraction unit 15b, the number of digits detected by the digit detector 72, and the bits extracted by the bit extractor 73 by the use of a linear interpolation formula. This makes it possible to check an increase in circuit scale in the radio apparatus 10 and reduce the power consumption of the radio apparatus 10.

An example of the hardware configuration of the radio apparatus 10 will now be described.

Figure 12:
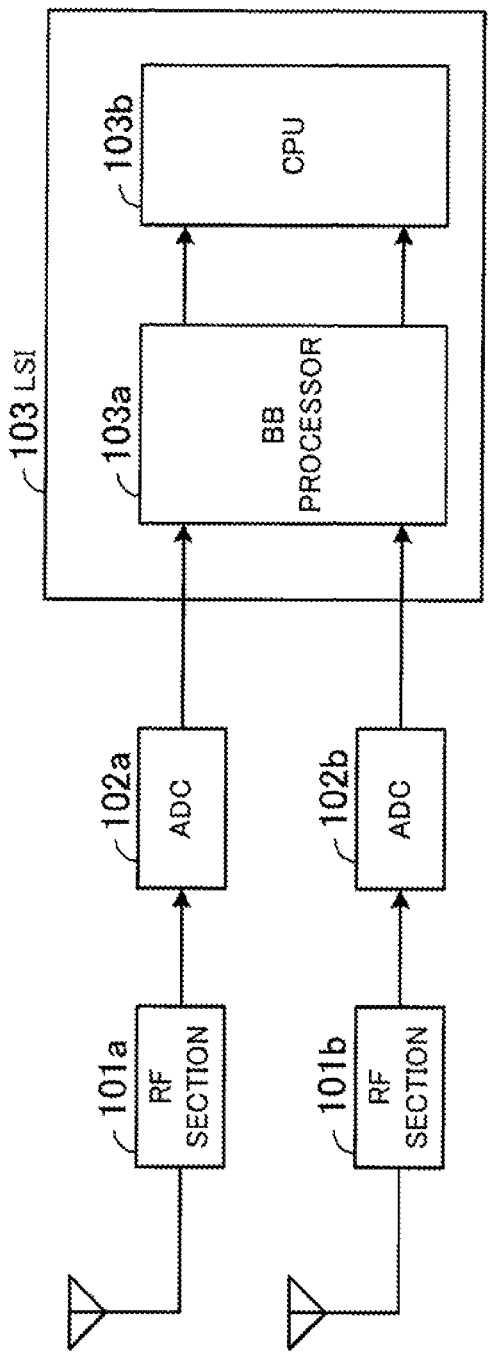
FIG. 12 is an example of the hardware configuration of the radio apparatus.

FIG. 12 is an example of the hardware configuration of the radio apparatus. As illustrated in FIG. 12, the radio apparatus 10 includes RF (Radio Frequency) sections 101a and 101b, ADCs (Analog-to-Digital Converters) 102a and 102b, and a LSI (Large Scale Integration) 103.

The RF sections 101a and 101b are formed as, for example, a one-chip semiconductor device. The ADCs 102a and 102b convert analog signals outputted from the RF sections 101a and 101b, respectively, to digital signals. The ADCs 102a and 102b are formed as, for example, a one-chip semiconductor device. The functions of the radio sections 12a and 12b illustrated in FIG. 5 are realized by, for example, the RF sections 101a and 101b and the ADCs 102a and 102b illustrated in FIG. 12.

The LSI 103 includes a BB (baseband) processor 103a and a CPU (Central Processing Unit) 103b. The functions of the subtraction section 1a and the calculation section 1b illustrated in FIG. 1 are realized by, for example, the BB processor 103a illustrated in FIG. 12. In addition, the functions of the symbol separation sections 13a and 13b, the channel estimation section 14 and the MLD processing section 15 illustrated in FIG. 5 are realized by, for example, the BB processor 103a illustrated in FIG. 12. The CPU 103b exercises communication control and performs communication process in an upper layer.

According to the disclosed radio apparatus and metric calculation method, it is possible to check an increase in circuit scale and reduce power consumption.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio apparatus for performing radio communication by the use of a plurality of antennas, the apparatus comprising:
    a subtraction section which subtracts from a received signal point a replica obtained by reflecting an influence of a propagation path state in a likely transmitted signal point; and
    a calculation section which calculates a metric for the received signal point and the replica from a value calculated by the subtraction section by the use of a linear interpolation formula obtained by separating a quadratic function at a power of 2;
    wherein:
    the linear interpolation formula is given by $$2^{n-1}\{|x|+2(|x|-2^{n-1})\}$$

where x is the value calculated by the subtraction section and n is a number of digits of the x; and
    the calculation section includes:
        an absolute value calculator which calculates |x| of the x;
        a detector which detects the n from the |x|;
        an extractor which extracts lowest (n−1) bits from the |x| and which outputs $(|x|-2^{n-1})$;
        a first shifter which performs a bit shift on the $(|x|-2^{n-1})$ and which outputs $2(|x|-2^{n-1})$;
        an adder which adds the |x| and the $2(|x|-2^{n-1})$ to calculate $\{|x|+2(|x|-2^{n-1})\}$; and
        a second shifter which performs a bit shift on the $\{|x|+2(|x|-2^{n-1})\}$ and which outputs $2^{n-1}\{|x|+2(|x|-2^{n-1})\}$.

2. The radio apparatus according to claim 1, wherein:
    the calculation section includes a detector which detects a number of digits of the value that is calculated by the subtraction section and that is represented by binary numbers; and
    the calculation section calculates the metric for the received signal point and the replica from the value calculated by the subtraction section and the number of digits detected by the detector by the use of the linear interpolation formula.

3. The radio apparatus according to claim 2, wherein:
    the calculation section further includes an extractor which extracts bits whose number is equal to a value obtained by subtracting one from the number of digits detected by the detector from the value calculated by the subtraction section; and
    the calculation section calculates the metric for the received signal point and the replica from the value calculated by the subtraction section, the number of digits detected by the detector, and the bits extracted by the extractor by the use of the linear interpolation formula.

4. A metric calculation method by a radio apparatus for performing radio communication by the use of a plurality of antennas, the method comprising:
    subtracting, by a subtraction section, from a received signal point a replica obtained by reflecting an influence of a propagation path state in a likely transmitted signal point; and
    calculating, by calculation section, a metric for the received signal point and the replica from a value obtained by subtracting the replica from the received signal point by the use of a linear interpolation formula obtained by separating a quadratic function at a power of 2;
    wherein:
    the linear interpolation formula is given by $$2^{n-1}\{|x|+2(|x|-2^{n-1})\}$$

where x is the value calculated by the subtraction section and n is a number of digits of the x; and
    the calculation section includes:
        an absolute value calculator which calculates |x| of the x;
        a detector which detects the n from the |x|;
        an extractor which extracts lowest (n−1) bits from the |x| and which outputs $(|x|-2^{n-1})$;
        a first shifter which performs a bit shift on the $(|x|-2^{n-1})$ and which outputs $2(|x|-2^{n-1})$;
        an adder which adds the |x| and the $2(|x|-2^{n-1})$ to calculate $\{|x|+2(|x|-2^{n-1})\}$; and
        a second shifter which performs a bit shift on the $\{|x|+2(|x|-2^{n-1})\}$ and which outputs $2^{n-1}\{|x|+2(|x|-2^{n-1})\}$.

* * * * *